United States Patent [19]

Whiteman

[11] Patent Number: 4,917,610
[45] Date of Patent: Apr. 17, 1990

[54] TRAINING APPARATUS FOR REMOTE CONTROL MODEL HELICOPTERS

[76] Inventor: Rock Whiteman, 12432 Gladstone Ave., Sylmar, Calif. 91342

[21] Appl. No.: 287,446

[22] Filed: Dec. 20, 1988

[51] Int. Cl.⁴ ............................................... G09B 9/08
[52] U.S. Cl. ..................................................... 434/33
[58] Field of Search .................... 434/33, 32, 51, 55, 434/56, 57, 58, 37; 446/7

[56] References Cited

U.S. PATENT DOCUMENTS

| | | | |
|---|---|---|---|
| 2,954,614 | 10/1960 | Vogt | 434/33 |
| 3,548,518 | 12/1970 | McRae | 434/33 X |
| 3,818,613 | 6/1974 | Julian et al. | 434/33 |
| 4,120,099 | 10/1978 | Fett | 434/33 X |

Primary Examiner—William H. Grieb

[57] ABSTRACT

A training stand for use in learning to fly remote control model helicopters without damaging the model. Model helicopters of various sizes can be removably connected to the training stand. The design of the training stand is such that the model helicopter can be made to fly forward, backward, sideways, up-and-down. The model helicopter can, also, be made to hover, rotate about its axis left and right and to pitch forward and backward while at all times remaining captive on the training stand.

11 Claims, 2 Drawing Sheets

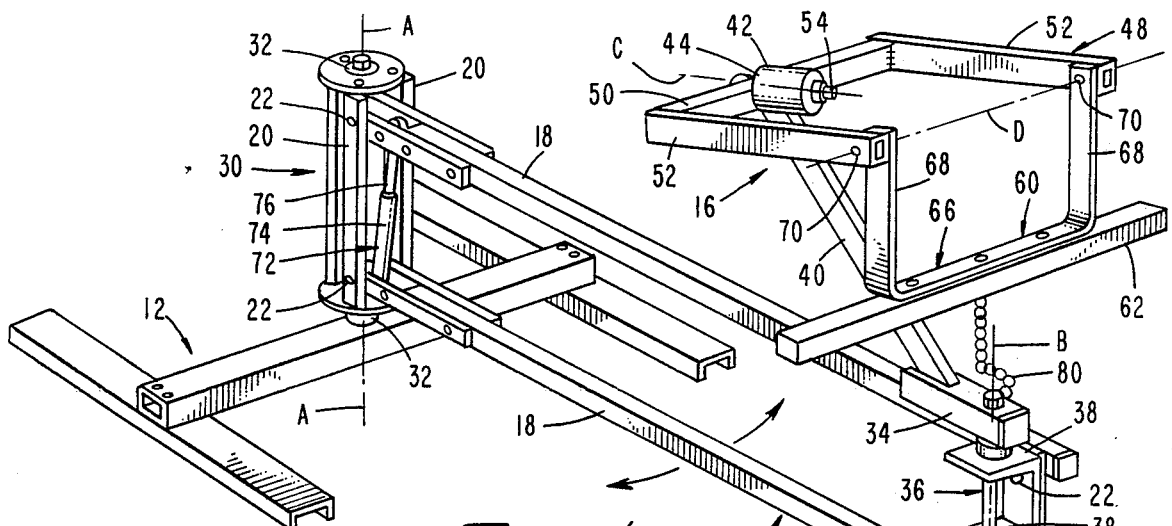
FIG. 1
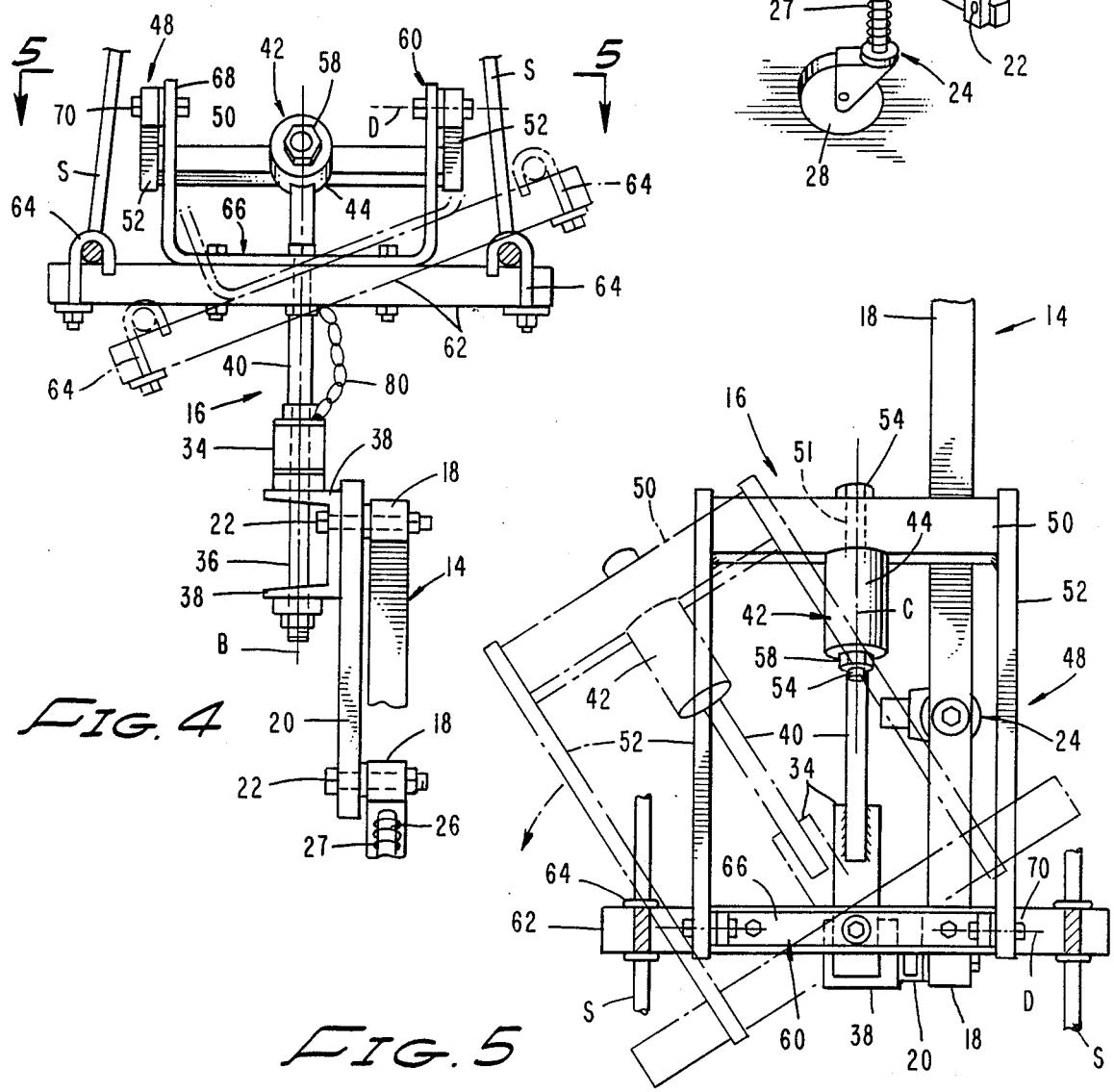
FIG. 4
FIG. 5

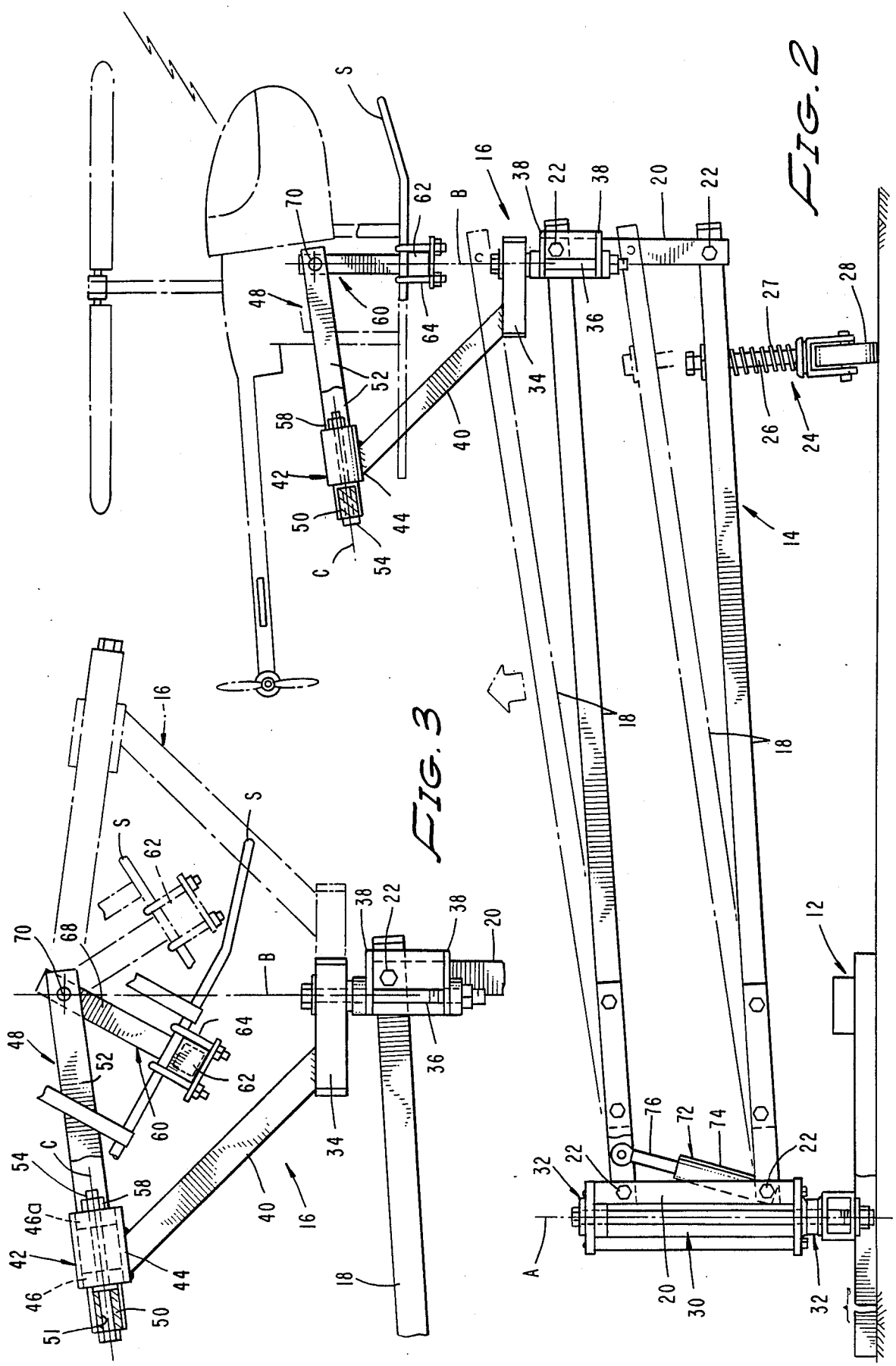

TRAINING APPARATUS FOR REMOTE CONTROL MODEL HELICOPTERS

BACKGROUND OF THE INVENTION

1. Field of the Invention

The present invention relates generally to training devices for learning to fly remote control model airplanes. More particularly, the invention concerns a training apparatus for learning to fly a remote control model helicopter without damaging the model.

2. Discussion of the Invention

Remote control model airplanes have become very popular in recent years. These models typically have an onboard engine, a flight control system simulating the control system of a full-scale airplane and electromechanical devices for operating the flight control system in response to signals from an onboard receiver. Signals are transmitted from the ground by a transmitter operated by the flyer. Remote control model helicopters are typically constructed in the manner described, but are usually more complex and substantially more difficult to fly. The remote control model helicopter can cost as much as several hundred dollars and can be severely damaged, even by a single crash. This can be most frustrating to the flyer because the flying time prior to the crash may only be a few minutes in duration.

The training apparatus of the present invention gives the user many hours of damage free flying time and pleasure while learning to master the skills necessary to safely fly the model in free flight. Because of the unique design of the training apparatus, even the novice operator can "fly" the model without damaging it. The training apparatus permits the user to "fly" the model helicopter backwards, forwards, sideways and up and down. The model can be made to takeoff and land, to hover and to fly in a large diameter circle at heights of several feet.

A novel feature of the training apparatus is a lifting mechanism which elevates the flying stand in a manner to neutralize its weight so that during flight the model helicopter is effectively lifting only its own weight. This feature adds even more realism to the practice flying and does not strain the helicopter. A shock absorbing, spring loaded castor is provided on the flying stand to support the apparatus during the takeoff and landing operations and to cushion excessive landing shock upon landing.

The training apparatus accepts model helicopters of various sizes and the model need not be modified in any way for use with the apparatus. For ease of storage and transport the training apparatus easily disassembles.

The design of the training apparatus is such that, during training, free flight of the model is closely simulated thereby enabling the trainee to develop the necessary eye-hand coordination and flight control skills to safely fly the model under free flight conditions. Costly crashes are thereby avoided and substantially greater pleasure is derived by the operator of the model.

SUMMARY OF THE INVENTION

It is an object of the present invention to provide a training apparatus for use in learning to fly remote control model helicopters in which the model helicopter can be detachably mounted within the apparatus and flown in a manner in all respects simulating free flight.

It is another object of the present invention to provide a training apparatus of the aforementioned character in which, during practice flight, the model helicopter is required to lift only its own weight.

Another object of the invention is to provide a training apparatus of the character described which is easy to use, even by the novice, and which effectively prevents damage to the model helicopter during practice flying sessions.

Still another object of the invention is to provide a training apparatus which will accept model helicopters of various sizes without the necessity of, in any way, modifying the model.

A further object of the invention is to provide a training apparatus of the character described in the proceeding paragraphs which is lightweight, is easily transported and is durable and reliable in use.

BRIEF DESCRIPTION OF THE DRAWINGS

FIG. 1 is a generally perspective view of the training apparatus of the present invention.

FIG. 2 is a side elevational view of the training apparatus.

FIG. 3 is a fragmentary view of the right or outboard end of the apparatus as viewed in FIG. 2.

FIG. 4 is a fragmentary front view of the upper portion of the apparatus; and

FIG. 5 is a fragmentary view taken along lines 5—5 of FIG. 4.

DESCRIPTION OF THE INVENTION

Referring to the drawings, and particularly to FIGS. 1 and 2, the training stand, or apparatus of the present invention comprises a generally horizontally disposed base assembly 12; a first support assembly 14 rotatably mounted on base assembly 12 for rotation about a first generally vertically extending axis A; and a second support assembly 16 rotatably mounted on first support assembly 14 for rotation about a second substantially vertically extending, spaced apart axis B (FIG. 2).

In the embodiment of the invention shown in the drawings, the first support assembly is provided in the form of a closed structure having a pair of spaced apart, elongated side struts 18 which are pivotally connected to a pair of spaced apart end struts 20. As best seen by referring to FIG. 2, the side struts 18 are pivotally connected to the end struts 20 by means of suitable connectors such as bolts 22. With this construction, the first support assembly is movable from an at rest position, as indicated in the solid lines in FIG. 2, to a multiplicity of elevated positions as, for example, the position illustrated by the phantom lines in FIG. 2.

Connected to lower strut 18, proximate its outboard end, is ground engaging shock absorbing means for absorbing shock imparted to the first support assembly during practice flying sessions. The ground engaging shock absorbing means is here provided in the form of a spring loaded castor assembly 24. Castor assembly 24 includes a shank portion 26 to which a castor wheel, assembly 28 is rotatably interconnected. Shank 26 extends through an aperture provided in lower strut 18 and is telescopically movable with respect thereto. Disposed intermediate castor wheel assembly 28 and lower strut 18 is a biasing means, shown here as a coil spring 28, which is yieldably deformable to permit a limited upward movement of shank 22 relative to lower strut 18 when the castor assembly strikes the ground during landing.

Comprising a part of base assembly 12 is a generally vertically extending column 30 to which the first support assembly is rotatably connected by means of upper and lower ball bearing subassemblies 32 carried by inboard end struts 20. With this construction, first support assembly 14 can rotate a full 360 degrees about column 30.

As best seen in FIG. 1, second support assembly 16 comprises a base support member 34 which is rotatably connected to first assembly 14 by means of an elongated bolt 36 which extends through apertures formed in a pair of vertically spaced apart side plates 38 which are connected to outboard end strut 20. With this construction, second assembly 16 can rotate throughout 360 degrees about axis D, which is the axis of bolt 36. Also forming a part of the second support assembly is an angularly upwardly extending member 40 which is connected to member 34 and which carries proximate its upper extremity a bearing assembly 42. Referring to FIG. 3, bearing assembly 42 comprises a cylindrically shaped sleeve 44 which carries at its opposite ends bearings 46. In a manner to presently be described, bearings 46, rotatably support a first frame 48.

As best seen in FIG. 1, first frame 48 comprises a transverse member 50 and first and second transversely spaced side members 52 which are connected at one end to member 50. Transverse member 50 is provided with an aperture 51 intermediate its ends for receiving an elongated bolt 54. As seen in FIG. 3, bolt 54 extends through aperture 51 provided in member 50, through the pair of bearings 46 and is held in place by threading of a nut 58 snug against the bearing designated in FIG. 3 by the numeral 46a. With this construction, first frame 48 is rotatable about a third axis C, which coincides with a longitudinal axis of bolt 54.

Turning again to FIG. 1, a second frame 60 is pivotally connected to frame 48 for rotation about a fourth axis D. Second frame 60 includes mounting means for carrying the model helicopter in the manner shown in FIG. 2. These mounting means here comprise a transversely extending mounting member 62 to which the skids S of the model helicopter can be removably connected by means of "J" bolts 64 (FIG. 2 and FIG. 4). Affixed to transversely extending member 62 is a U-shaped member 66 which includes a pair of transversely spaced connector members 68. Connector members 68 are pivotally connected proximate their free ends to transversely spaced apart members 52 of first frame 48 by means of pivot pins 70. With this construction, second frame 60 is free to rotate about an axis D which corresponds to the axis of the pivot pins 70 (FIG. 1).

Forming an important aspect of the apparatus of the present invention, is lifting means for elevating the first support assembly relative to base assembly 12. In the present embodiment of the invention, this elevating means is provided in the form of a gas filled strut, or hydraulic shock absorber unit 72. As indicated in FIG. 2, unit 72 includes a piston housing 74 which is carried by base assembly 12, a piston reciprocally removable within housing 74, (not shown) and a connecting rod 76, the free end of which is pivotally connected to upper strut 18 of first support assembly 14. This gas strut or hydraulic unit is commercially available and is of a standard construction well understood by those skilled in the art. The function of the unit is to counterbalance the weight of the first and second support assemblies and the weight of the model helicopter itself so that, during practice flying, the helicopter is substantially lifting only its own weight with the weight of the training stand assemblies being substantially carried by the lifting means of the invention. This feature enables even greater realism to be realized during practice flying of the model helicopter since the model is essentially lifting its own weight as it would during free flight and does not strain the helicopter.

As earlier mentioned, first assembly 14 is free to rotate about axis A through an angle of 360 degrees. Similarly as best seen in FIG. 5, second assembly 16 is free to rotate about axis B (an axis extending vertically relative to the plane of the paper) throughout an angle of 360 degrees. Turning to FIG. 4, the phantom lines illustrate the rolling movement of the second assembly about axis C (FIG. 3). Rotation of the second assembly about axis C permits a rolling motion of the model helicopter about its own longitudinal axis through a limited angle governed by novel limit means of the invention, shown here as an adjustable length of chain 80. Chain 80 is made up of a plurality of links, the upper links of which are constructed of metal and the lower links of which are constructed of an electrically nonconductive material such as nylon or the like. With this construction, the model helicopter is at all times insulated in a manner to preclude interference with the servomechanisms and with the control signals transmitted by the remote transmitter. Chain 80 is of a critical length to controllably limit the degree of rolling of the helicopter in a manner to simulate free flight conditions, but at the same time prevent damage to the helicopter which might be caused by excessive rolling through too great an angle.

Referring now to FIG. 3, the rotational movement of the second assembly 16 about axis B is illustrated by the phantom lines of FIG. 3. FIG. 3 also illustrates the pitching motion of the model helicopter made possible by the pivotal movement of the second frame 60 with respect to first frame 48 about axis D (FIG. 1). This up-and-down pitching movement of the second frame along with the model helicopter mounted thereon adds further realism to the flight of the model helicopter on the training stand.

The structural members of the first and second support assemblies of the apparatus are preferably constructed of a lightweight material such as tubular aluminum. Further, suitable connectors are used to interconnect the first and second support assemblies with the base assembly so that the apparatus can be easily disassembled for transport and storage.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

I claim:

1. A training apparatus for use in learning to fly remote control model helicopters, comprising:
   (a) a generally horizontal base;
   (b) a first support assembly rotatably mounted on said base for rotation about a first axis;
   (c) a second support assembly rotatably mounted on said first support assembly for rotation about a second axis spaced apart from said first axis, said second support assembly comprising:

(i) an upwardly extending member;

(ii) a first frame rotatably supported by said upwardly extending member for rotation about a third axis spaced apart from said first and second axes; and (iv) a second frame mounted on said first frame for rotation about a fourth axis, said second frame including mounting means for carrying the model helicopter.

2. A training apparatus as defined in claim 1 in which said first axis is generally vertical and in which said third axis is generally horizontal when the apparatus is at rest.

3. A training apparatus as defined in claim 2 in which said fourth axis extends transversely of said second frame of said second support assembly.

4. A training apparatus as defined in claim 3 including lift means for elevating said first support assembly relative to said base.

5. A training apparatus for use in learning to fly remote control model helicopters, comprising:

(a) a generally horizontal base having a longitudinal axis and a transverse axis;

(b) a first support assembly rotatably mounted on said base for rotation about a first generally vertical axis;

(c) a second support assembly rotatably mounted on said first support assembly for rotation about a second spaced apart axis, said second support assembly comprising:

(i) an upwardly extending member;

(ii) a bearing assembly carried by said upwardly extending member;

(iii) a first frame rotatably supported by said bearing assembly for rotation about a third axis;

(iv) a second frame mounted on said first frame for rotation about a fourth axis extending transversely to said third axis, said second frame including a transverse mounting member to which the model helicopter can be removably connected.

6. An apparatus as defined in claim 5 including lifting means for elevating one end of said first support assembly relative to said base.

7. An apparatus as defined in claim 5 in which said first support assembly includes an upper strut, a lower strut extending generally parallel to said upper strut and a ground engaging wheel mounted on said lower strut.

8. A training apparatus for use in learning to fly remote control model helicopters, comprising:

(a) a generally horizontal base having a longitudinal axis and a transverse axis;

(b) a first support assembly rotatably mounted on said base for rotation about a generally vertical axis, said first support assembly having an inboard end;

(c) a second support assembly rotatably mounted on said first support assembly proximate said outboard end thereof for rotation about a second, spaced apart axis, said second support assembly comprising:

(i) an angularly upwardly extending member;

(ii) a bearing assembly carried by said upwardly extending member;

(iii) a first frame rotatably supported by said bearing assembly for rotation about a third axis, said first frame comprising a transverse member and first and second transversely spaced side members connected to said transverse member; and (iv) a second frame comprising transversely space connector members interconnected by a transverse mounting member to which the model helicopter can be removably connected, said connector members being pivotally connected to said side members; and (d) lifting means for elevating said outboard end of said first support assembly relative to said base.

9. An apparatus as defined in claim 8 in which said lifting means comprises a hydraulic cylinder disposed intermediate said base and said first support assembly proximate said inboard end thereof.

10. A training apparatus as defined in claim 9 in which said first support assembly comprises a pair of spaced apart, elongated side struts pivotally connected to a pair of spaced apart end struts and further including ground engaging shock absorbing means connected to one of said elongated side struts for absorbing shock imparted to said first support assembly during use of the training apparatus.

11. A training apparatus as defined in claim 10 further including limit means carried by said second support assembly for controllably limiting the rotation of said first frame about said third axis.

* * * * *